INVENTOR
ARTHUR J. SLEMMONS
BY Hans G. Hoffmeister
ATTORNEY

INVENTOR
ARTHUR J. SLEMMONS

BY Hans G. Hoffmeister
ATTORNEY

INVENTOR
ARTHUR J. SLEMMONS

BY Hans G. Hoffmeister
ATTORNEY

INVENTOR
ARTHUR J. SLEMMONS
BY Hans G. Hoffmeister
ATTORNEY

INVENTOR
ARTHUR J. SLEMMONS
BY Hans G. Hoffmeister
ATTORNEY

BALANCER

INVENTOR
ARTHUR J. SLEMMONS
BY Hans G. Hoffmeister
ATTORNEY $$\text{ANGLE } a = \frac{\overbrace{\frac{2W3}{g}\,\omega^2\, r3\, d3}^{\text{(UNBALANCE COUPLE)}}}{\underbrace{(Ip-Id)\,\omega^2}_{\text{(DYNAMIC RESTORING COUPLE)}} - \underbrace{\frac{Wt}{g}\,\omega^2\, dt}_{\text{(CENTRIFUGAL TILTING COUPLE)}} + \underbrace{Wt\; rt}_{\text{(GRAVITY RESTORING COUPLE)}}}$$

INVENTOR
ARTHUR J. SLEMMONS
BY Hans G. Hoffmeister
ATTORNEY

INVENTOR
ARTHUR J. SLEMMONS
BY Hans G. Hoffmeister
ATTORNEY

United States Patent Office 3,289,483

Patented Dec. 6, 1966

3,289,483

BALANCER

Arthur J. Slemmons, Los Gatos, Calif., assignor to FMC Corporation, San Jose, Calif., a corporation of Delaware Filed Mar. 17, 1964, Ser. No. 352,587
21 Claims. (Cl. 73—459)

This invention relates to balancing rotating machinery components, and more particularly to an apparatus for balancing vehicle wheels, statically, dynamically or both. The term "wheel" as it is used herein, refers to vehicle wheels such as automobile wheels or the like, particularly when they include a rim upon which is mounted a pneumatic tire.

The desirability of placing such wheels in both static and dynamic balance under modern high speed operating conditions is well known in the vehicle art. Tire manufacturers often statically balance their tires by the application of a heavy pigmented paint to the inside thereof, at the factory. Even so, the conditions of static unbalance may occur when the tires and rims are assembled, and these assemblies are seldom in perfect static or dynamic balance, so that the static and dynamic balancing must take place after the assembly of the tires and their respective wheels.

Heretofore, dynamic balancing has required the use of an expensive and elaborate machine which rotates the wheels at a high angular velocity, while they are mounted on unbalance-sensitive axles. The unbalance has been sensed visually or by complex transducers, and magnified by expensive and complicated electrical, optical or lever systems.

It is an object of the present invention to provide an improved static and dynamic balancer.

It is also an object of the present invention to provide a combined static and dynamic wheel balancer that is simple and economical in construction, and is suitable for widespread use in service stations, garages, and the like.

Another object is to provide a dynamic wheel balancer that requires no power-drive, and which will balance the wheels at a low angular velocity, such as that which can be imparted to the wheels by merely spinning them by hand.

Still another object is to provide a dynamic wheel balancer in which the condition of dynamic unbalance is correctly indicated, substantially independently of the angular velocity of the wheel.

Another object of the present invention is to provide a dynamic wheel balancer of the type described, wherein the system rotates on a self-aligning bearing during dynamic balancing. A weight gives the system a high diametral moment of inertia about the self-aligning bearing, which weight is mounted below the bearing. In accordance with the present invention, the difference between the polar and the diametral moments of inertia of the rotor-wheel system is made quite small, with the result that a large angle of gyration (wobble) is obtained, even though the unbalance of the system is small and the angular velocity imparted to the wheel is small in magnitude.

It is also an object of the present invention to provide a combined static and dynamic wheel balancer which makes possible use of the simple, two plane balancing technique. This is made possible by positioning the lower side flange of the tire rim in the plane of the self-aligning bearing, during the dynamic balancing operation.

Another object of the present invention is to provide a damping unit in a combined dynamic and static wheel balancer, which is effective only during the static balancing operation.

Another object is to provide a wheel balancer with a self-aligning bearing that is sealed against the entry of dirt into the bearing. In accordance wtih the present invention, a liquid damping unit provides this seal.

Another object is to provide a dynamic balancer that is self-erecting at its maximum wobble angle.

It is an object of the present invention to provide a single lever control for placing the wheel body element of the balancer in a low position for static unbalance, an intermediate position for spinning the wheel for dynamic balancing, and an upper position for carrying out the dynamic balancing operation.

It is an object of the present invention to provide a spirit level which is easily read, particularly on a dynamic balancer. This object is obtained by causing the upper and lower walls of the level to flatten the level bubble.

It is also an object of the present invention to provide an indicia system for the spirit level that can be read while the wheel axis is gyrating (wobbling), during the dynamic balancing operation.

Another object is to provide a spirit level of the type described that employs colored sectors for identification of the position of the dynamic unbalance.

Still another object is to provide a spirit level which not only employs colored segments for indicating the circumferential position of the dynamic unbalance, but further employs concentric rings or rows of indicia for indicating the amount of the unbalance.

Another object is to provide a spirit level of the type described wherein the dynamic unbalance can be determined by a color blind individual.

Still another object is to accentuate the bubble outline in the liquid of the level, without relying on a colored band around the inside edge of the level compartment.

The manner in which these, and other objects of the present invention may be carried out by those skilled in the art will be apparent from the following detailed description of the invention.

*General description*

Figure 1:
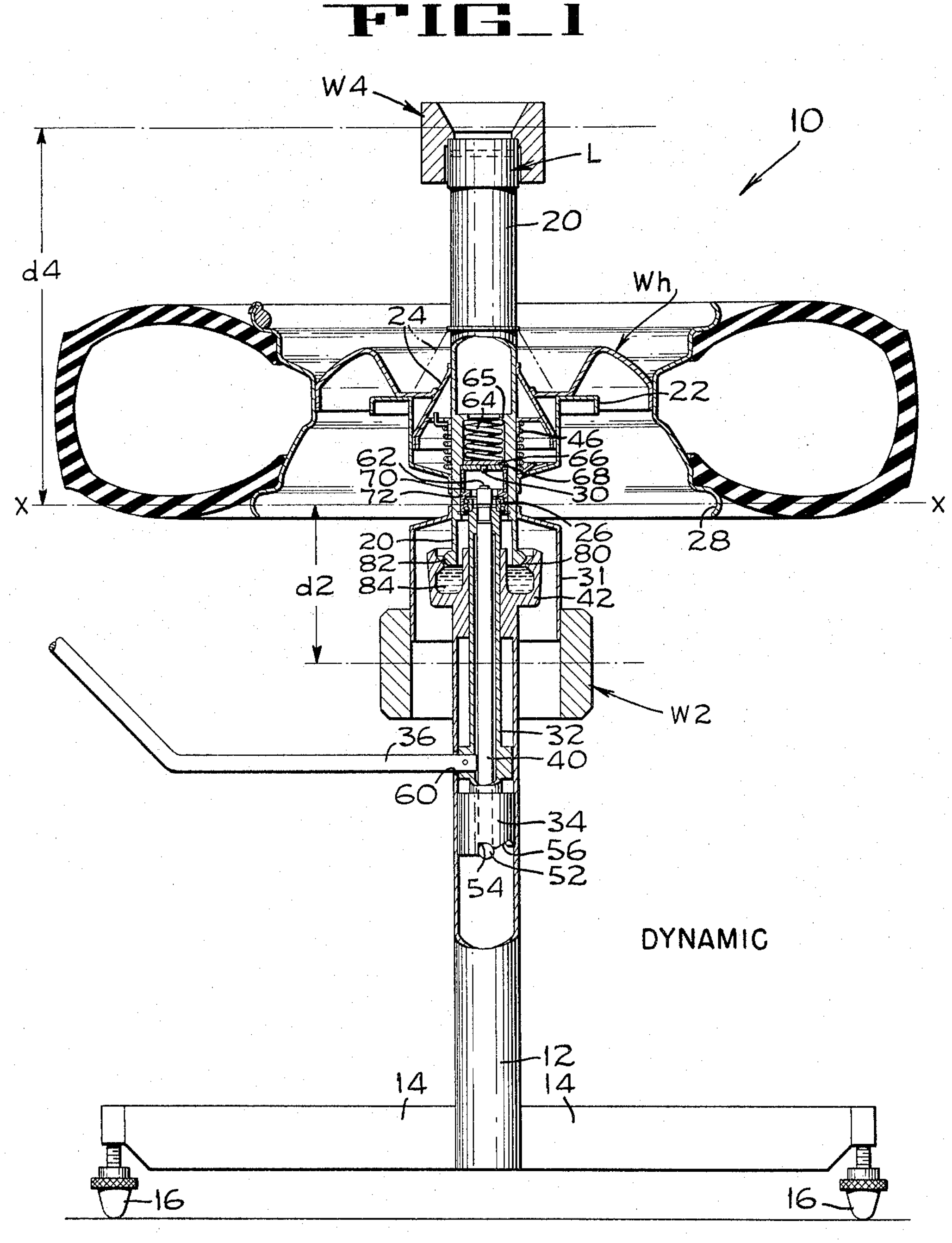
FIG. 1 is a vertical section through the wheel balancer of the present invention, with the balancer in the dynamic balance position.

The basic elements of a combined static and dynamic pneumatic tired wheel balancer embodying the invention will be now described referring generally to FIGURE 1 of the drawings. In the broader aspects of the invention, use of the apparatus is not limited to the balancing of vehicle wheels.

In FIGURE 1, the balancer is shown in its dynamic position, and is indicated generally at 10. The balancer 10 includes a tubular pedestal 12 supported on three equally spaced legs 14 and steel or rubber feet 16. Above the pedestal is a wheel mounting element 20, in the form of a generally vertical tube which carries a wheel mounting flange 22.

A spring loaded mounting cone 24 is slidably mounted on the wheel mounting tube 20, for centering the hub flange of the wheel W*h* on the flange 22.

A self-aligning bearing 26 is mounted within the wheel mounting tube 20, which bearing is used during the dynamic balancing operation, as will be described. It will be noted that the recurved end of the lower rim side flange 28 of the wheel W*h* is bisected by a plane *x—x* that contains the wobble axis of the self-aligning bearing 26. As will be explained, this is important in that it permits the use of what is usually termed the two plane balancing technique, for obtaining static and dynamic balance of the wheel.

A universal bearing ball 30 is also mounted in the wheel mounting tube 20, to serve as a pivot during the static balancing operation, as will be described.

A skirt 31 is welded to the pedestal tube 12 and mounts a depending weight W2, which is provided in order to increase the diametral moment of inertia of the system as the wheel axis gyrates during dynamic balancing. A universal type circular spirit level L is mounted on the upper end of the wheel mounting tube 20. The construction of this level is important to the ease of operating and reading the device, and details thereof will be described presently. A removable auxiliary weight W4 has been placed on the upper end of the wheel mounting tube 20 in FIGURE 1. This weight is also provided for increasing the diametral moment of inertia of the system during dynamic balancing, it is not used for static balancing. The weight W4 is one of a number of weights which are provided with the balancer, in order to make possible fine adjustment of the balancer for wide variations of tire section and weight.

Forming part of the pedestal assembly is a vertically movable control sleeve 32, the lower end of which carries a control cam 34. A handle 36 projects outwardly from the cam 34, and as will be seen, rotation of this handle provides for placing the balancer in the static, spin and dynamic positions. A vertically extending static balance pedestal rod 40 is mounted within the sleeve 32. This rod is only employed in the static balancing position when it supports the wheel. A combined damping and seal cup 42 forms the upper end of the pedestal 12.

Figures 2, 3:
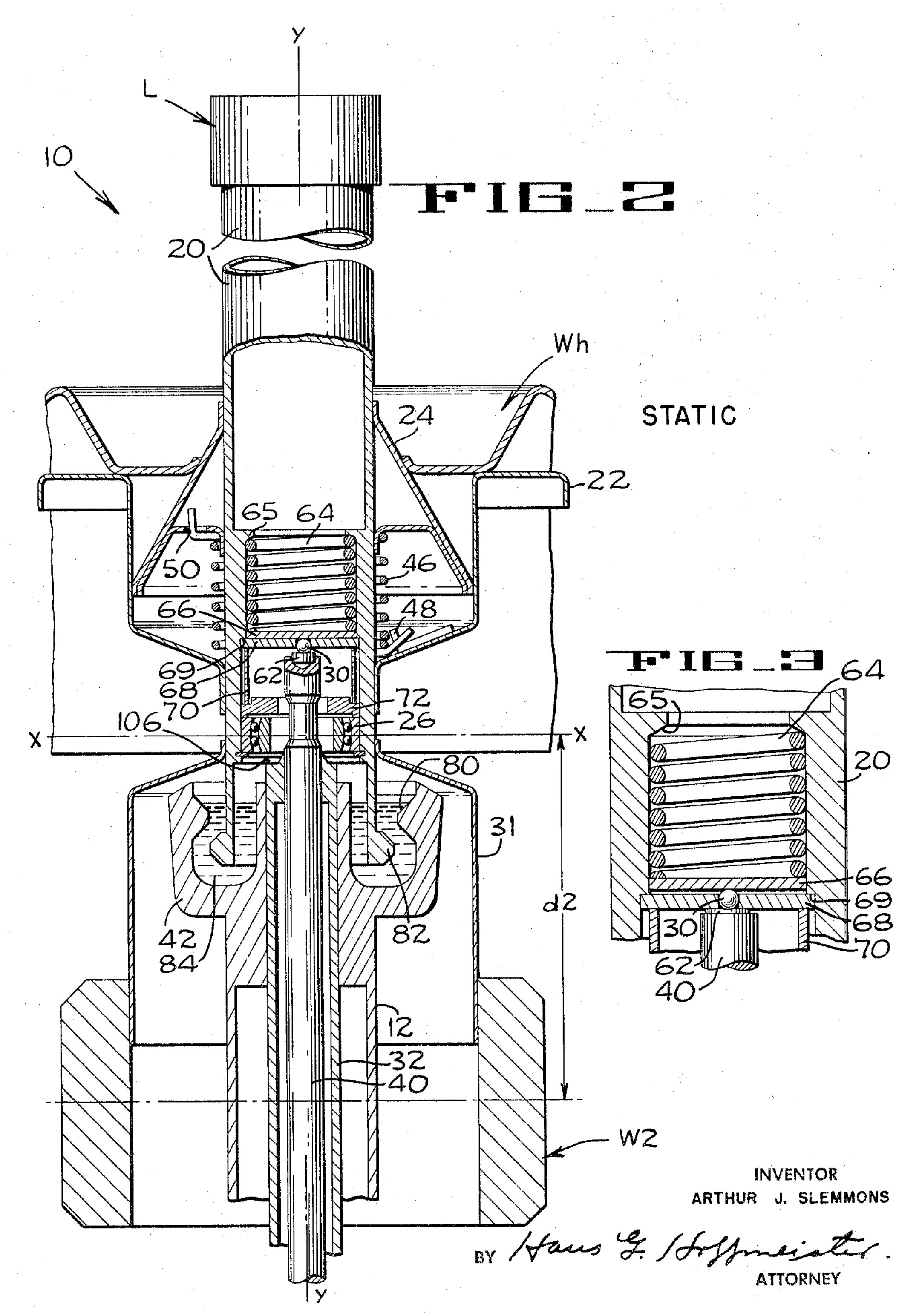
FIG. 2 is an enlarged fragmentary section through the balancer showing the balancer in the static balancer position.
FIG. 3 is a still further enlarged fragmentary section like that of FIG. 2, showing the balancer when it is overloaded in the static position.

The Static balancing position of the balancer is shown in FIGURE 2. The centering cone 24 has been referred to. The cone is spring extended by a loading spring 46, and the spring is prevented from rotation by stop lugs 48, 50 which engage end projections of the spring 46. This prevents the spring from changing position, and maintains the factory balance of the unit.

In order to support the wheel mounting tube 20 during static balancing, a transversely extending pedestal pin 52 is fixed in the pedestal 12, and the lower end of the pedestal rod 40 is supported on the pin 52. The control cam 34 has static, spin and dynamic detents 54, 58 and 60, respectively, these detents being arranged in opposed pairs. A development of one set of these detents appears in FIG. 8. A slot 60 is provided in the pedestal 12, to permit rotation of the handle 36 for selecting the position of the balancer.

A hardened steel anvil 62 is press-fitted into the upper end of the pedestal rod 40, for supporting the universal bearing ball 30, during the static balancing operation. As best seen in FIGURE 3, means are provided to prevent indentation of the anvil 62 by the hardened ball 30, in case a wheel is dropped or slammed down upon the supporting flange 22. A pre-load spring 64 is mounted between a flange 65 fixed on the wheel mounting tube 20, and a backup plate 66 for the universal bearing ball 30. A stake plate 68, which is apertured to receive the ball 30, is held against a shoulder 69 in the tube 20 by a spacer sleeve 70. The other end of this spacer sleeve 70 engages an upper retainer plate 72 for locating the outer race of the self-aligning bearing 26. The ball 30 is staked in its aperture in plate 68, so that it cannot fall out in the spin and dynamic positions.

Figure 4:
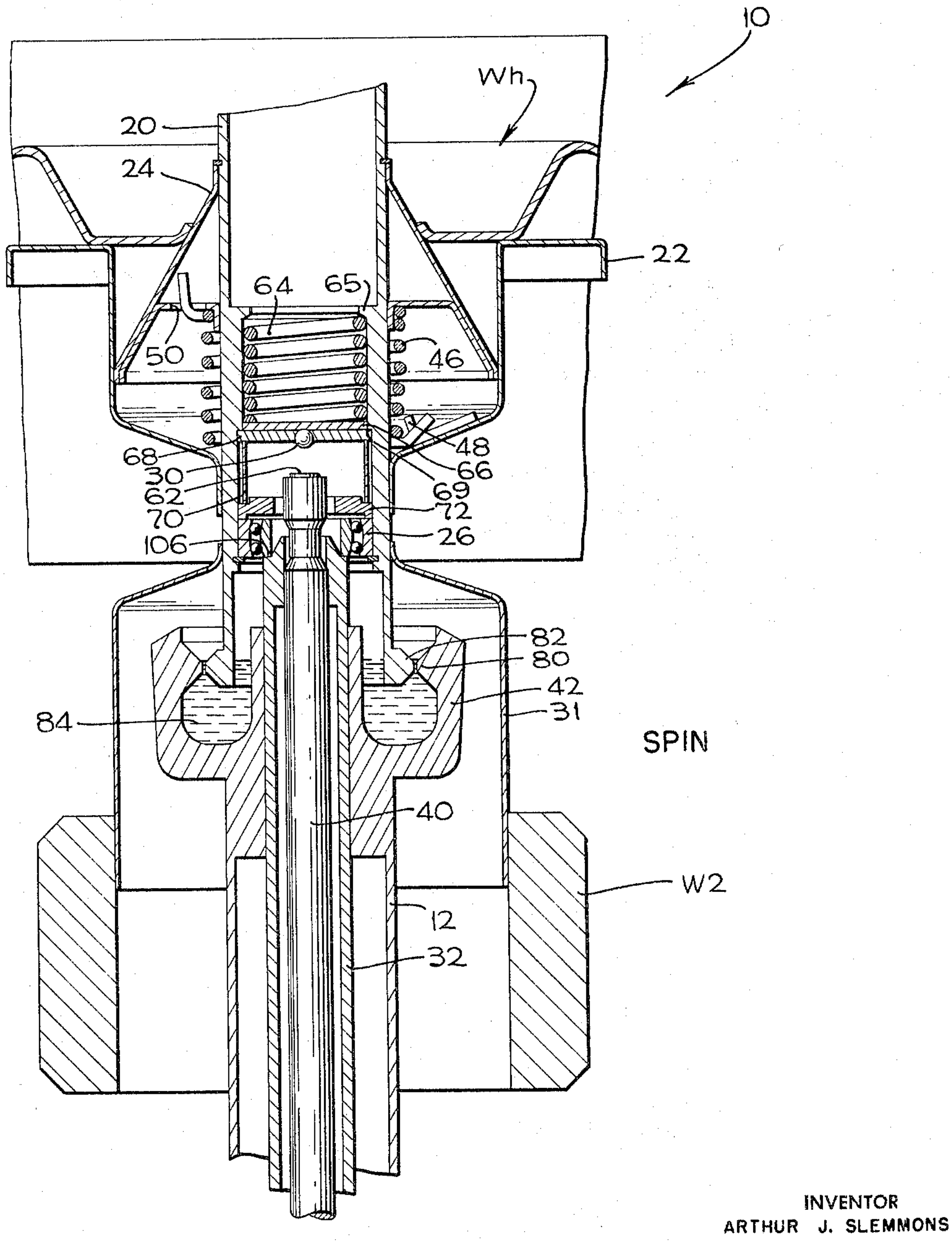
FIG. 4 is a view like FIG. 2 showing the balancer in the spin position.

As best seen in FIGURE 2 a damping assembly is provided, which is effective only during the static balancing operation. The primary purpose of this assembly is to damp oscillation of the balancer during the static balancing operation so that an unbalance reading can be obtained quickly. Furthermore, the assembly acts as a liquid seal to protect the self aligning bearing 26 from dirt and dust, and provides lubrication in the spin position. The cup 42, formed on the pedestal 12 adjacent the upper end thereof, has an annular internal projection 80. A ring paddle, 82 is formed on the lower end of the wheel mounting tube 20, a damping liquid 84 such as a petroleum oil S.A.E. grade 50 is contained by the cup 42. The paddle 82 is immersed in the body 84 of oil during the static balancing operation, and hence there is a damping action. The annular projection 80 on the cup 42 centers the wheel mounting tube 20 during the spin operation as seen in FIGURE 4.

Figure 9:
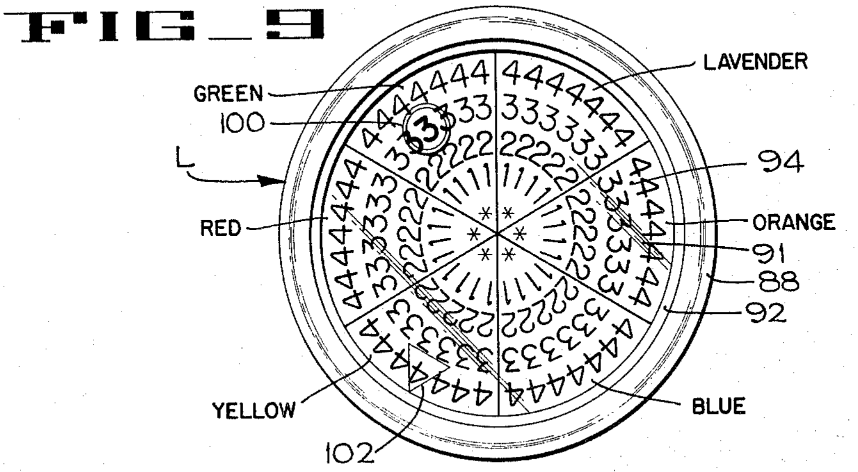
FIG. 9 is a plan of the spirit level of the present invention.
Figure 10:
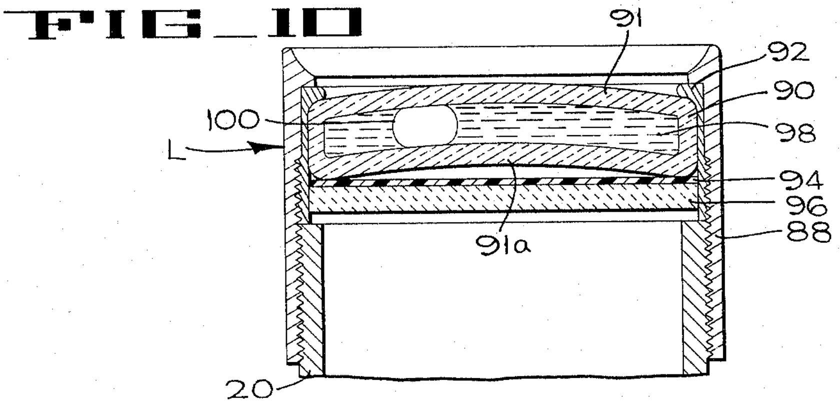
FIG. 10 is a section through the spirit level.

The spirit level L is especially suitable for reading both static and dynamic unbalance, as measured by the apparatus of the present invention. This level is illustrated in FIGURES 9 and 10, and includes a bezel tube 88 threaded to the upper end of the wheel mounting tube 20. The spirit level proper has a circular, generally flat glass level chamber 90, the upper wall 91 thereof being curved over a very large radius to provide the desired sensitivity of the level. The level chamber 90 is mounted in a mounting ring 92, and below the chamber 90 is an indicia card 94. The level chamber and the indicia card are retained in the mounting ring 94 by a body 96 of plaster of Paris. This much of the level construction is conventional. The liquid 98 in the chamber 90, which permits formation of the level bubble 100, is selected so that it can be tinted slightly by readily available dies. In the present invention the level liquid 98 is kerosene and is tinted to be a very light gray for reasons to be explained.

An important feature of the level L of the present invention is a fact that the bubble 100 is formed so as to provide two desirable characteristics. First, the periphery or boundary of the bubble is readily ascertained, so that it can be visually distinguished from the body 98 of the liquid end level. The periphery of the bubble appears as a black line. This characteristic is implemented by the gray tinting of the liquid just referred to. Secondly, the spacing of the outer glass wall 91 of the level and the opposite glass wall 91*a* thereof, is such that the bubble 100 is axially flattened. This has two advantages. The flattening accentuates the boundaries of the bubble, which appear as if they were bounded by a black line. Secondly, the bubble provides a clear window, large enough to view the indicia on the indicia card 94. No color band around the rim of the bubble is required.

One of the difficulties in determining unbalance indications during dynamic unbalance is that of determing both the circumferential and radial position of the bubble 100 in the level L, even though the system is rotating slowly. This problem is solved in the present invention by printing the indicia card to exhibit six sectors, each of a different color, as indicated in FIGURE 9 of the drawings, the gray tinting of the level liquid 98 partially obscures or masks all of the colors and indicia except that visible through the clearly defined bubble 100.

Figures 11, 11A, 11B, 11C:
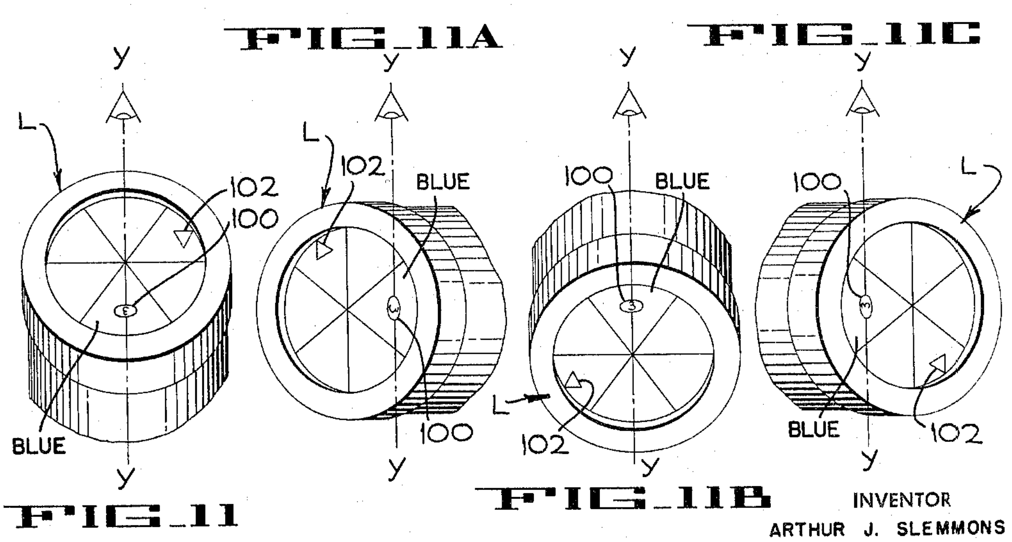
FIGS. 11, 11A, 11B and 11C are diagrammatic views showing the appearance of the spirit level during one gyration, or wobble of the axis of rotation of the system, as it would appear to an observer. The angles of inclination are exaggerated in these figures.

In order to indicate the amount of dynamic unbalance, circumferential rows of indicia are supplied. As seen in FIGURE 9, there are a row of asterisks, and a row of ones, twos, threes, and fours, moving radially outwardly from the central axis of the level. During the dynamic balancing operation, the wheel and level rotate about an axis *y'—y'* (FIG. 5) and gyrate about the vertical axis *y—y*, but the bubble remains fixed in space. Thus, as seen in FIGURES 11–11C, the observer centers his eye over the fixed bubble, and one of the colored sectors will have moved under the bubble, the blue sector in these figures. The bubble stays over this sector as the unbalanced wheel rotates, and the only thing that turns is the indicia (the number 3 in FIGURES 11–11C). But this number, which indicates the degree of unbalance, does not precess about the axis *y—y* of the apparatus but merely rotates within the bubble of the wheel, and since it is at the center of the vertical axis *y—y*, it is easily read by the observer.

Due to the limitations inherent in India ink Patent Office drawings, FIG. 9 is not a true representative of the appearance of the level. Actually the area not under the bubble is almost obscured by the gray tinted level liquid.

Figure 5:
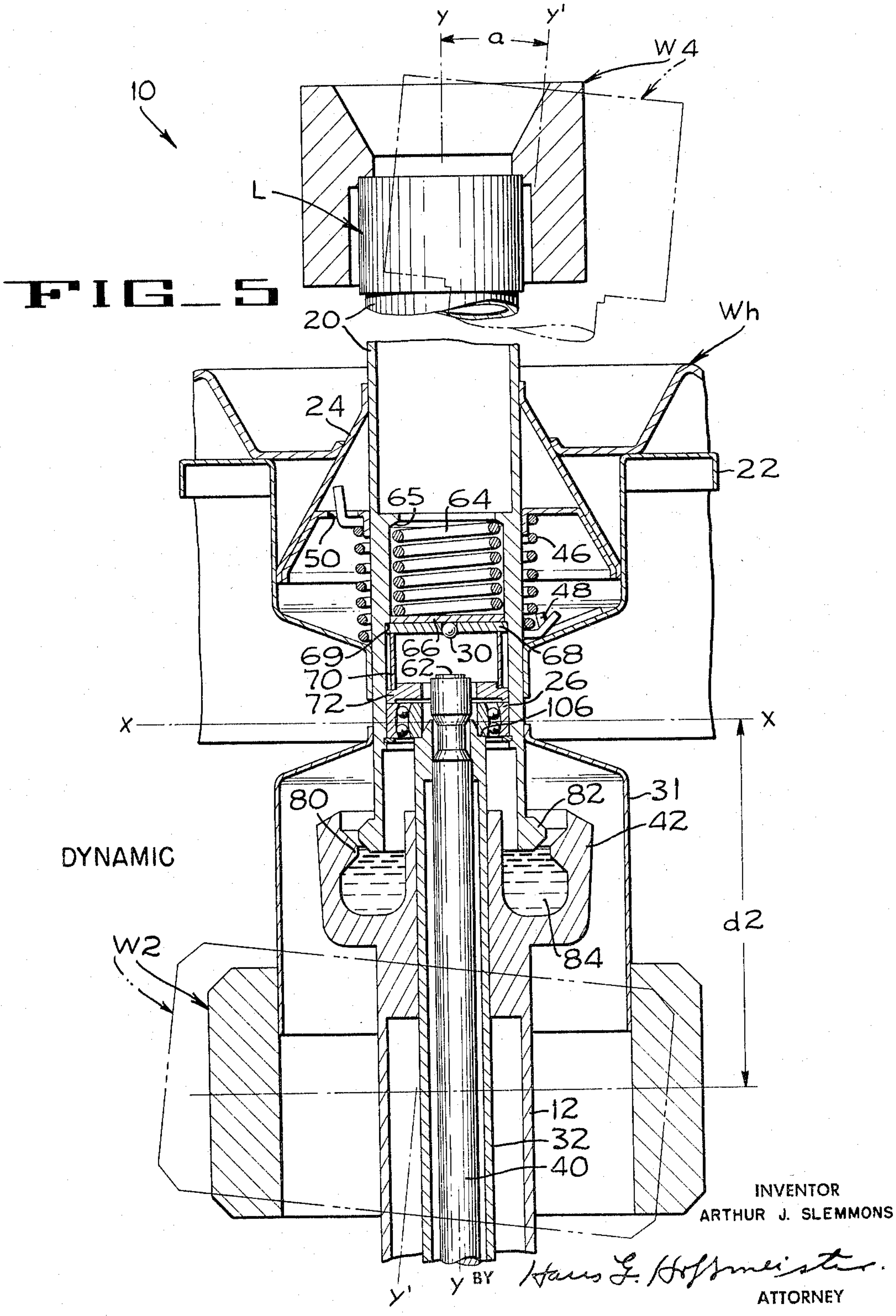
FIG. 5 is a view like FIG. 2 showing the balancer in the dynamic balancing position.
Figure 6:
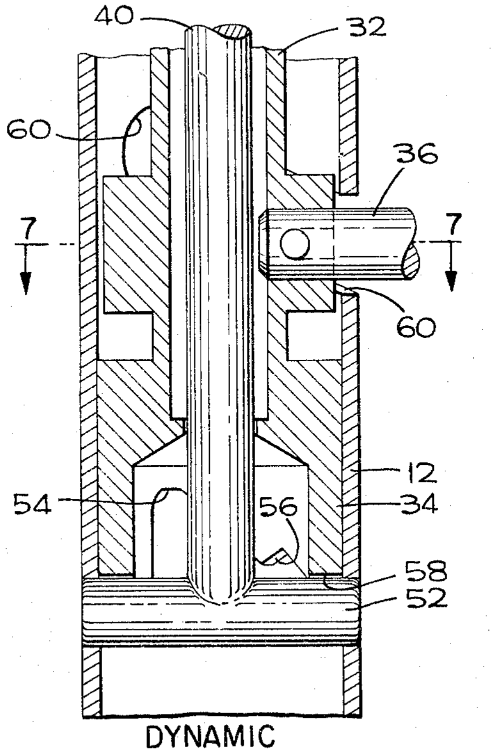
FIG. 6 is a fragmentary section through the balancer at the control cam, with the balancer in the dynamic position.
Figure 7:
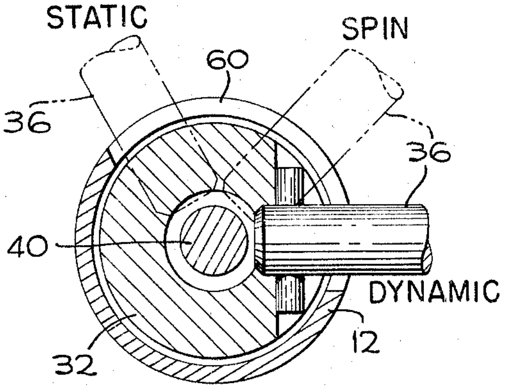
FIG. 7 is a section taken on lines 7—7 of FIG. 6.
Figure 12:
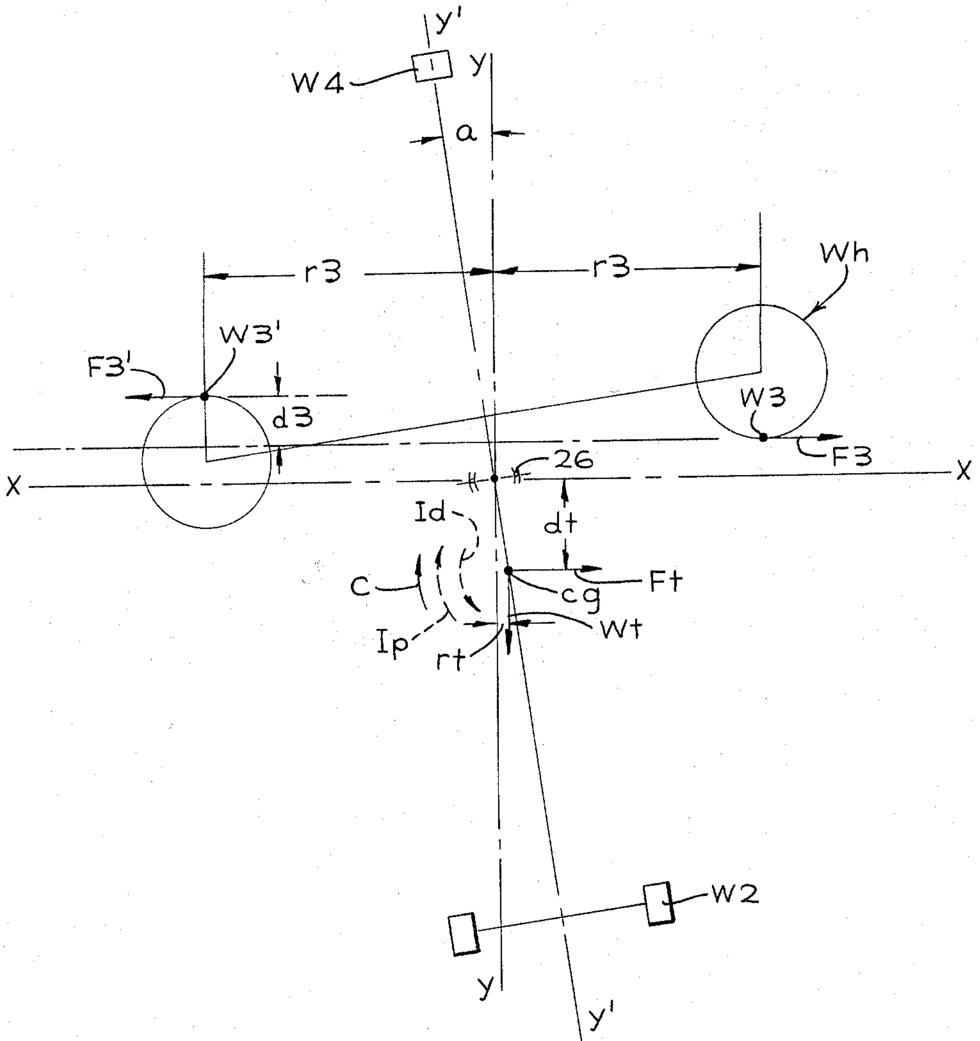
FIG. 12 is a diagram showing the principles of increasing balance sensitivity.

These advantages are accentuated by the fact that due to the novel design of the apparatus relative to theoretical balancing considerations, the wheel need not be rotated rapidly during operation to obtain an acceptable unbalance or wobble angle "*a*" FIGS. 5 and 12. In fact, operation of the device, as will be seen, is for all practical purposes independent of rotational speed, and will accurately indicate dynamic unbalance with a rotational speed that is manually imparted thereto in the order of one or two revolutions per second.

For an observer who does not have trichromatic vision, such as anomalous trichromats, dichromats, and even monochromats, an indicia card such as card 94 has been developed and can be incorporated in a replacement level for the standard level element L. This indicia card, which is not illustrated because of the limitations in Patent Office drawings, has six sectors as before, but these sectors embody only white, gray and black tints so that no color perception is required, only a perception of intensity. There will be two white sectors, one with black indicia and one with gray indicia; two black sectors, one with white indicia and one with gray indicia; and two gray sectors, one with black indicia and one with white indicia. Thus only brightness or intensity perception such as that available to monochromats is all that is necessary for operating the apparatus. The color blind corrected level would not ordinarily be required, since of the 8 percent of the male population which are color blind, six percent of those are anomalous trichromats, which means that they have some color perception in three hues, the regular indicia card 94 with colored sectors will probably be satisfactory. The dichromats and monochromats, who compose only two percent of the male population, may require the special color blind indicia card just described.

*Balancing*

Balancing can be effected by first adding a wheel weight to statically balance a rotor and then adding two equal weights, each in a different plane and 180° away from each other to dynamically balance the rotor.

The balancing machine of the present invention can also operate on the well known two plane balancing principle. Both of these principles are known in the art, but the latter will be described briefly in connection with FIGURE 15 and 16, in order to expedite an understanding of an operating procedure used with the invention.

Figure 15:
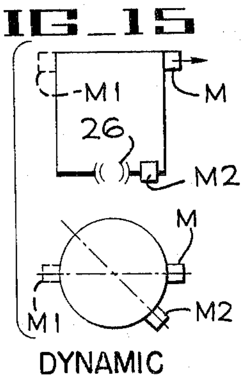
FIGS. 15 and 16 are diagrams illustrating the principles of two plane balancing, this being one manner in which the instrument can be used.
Figure 16:
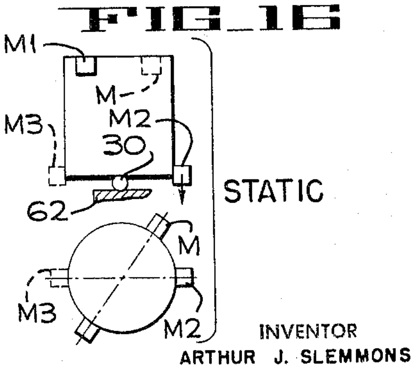

Referring to FIGURE 15, it will be assumed that a circular cylinder has unbalance masses M and M2 in two planes, which masses can be considered to give a rotating centrifugal force and rotating couple equivalent to that of any unbalanced rotor. The cylinder is mounted so that the lower equivalent mass M2 is in the plane of a self-aligning bearing, such as the bearing 26 employed in the apparatus of the present invention. The cylinder is now rotated, and the unbalance mass M is corrected by a mass M1 at 180° thereto. The lower mass M2 cannot make the cylinder wobble during this dynamic balancing operation, because it is in the plane of the self aligning bearing. The body is next balanced statically, as shown in FIGURE 16, by permitting it to pivot about a universal bearing 30, 62. Here only the force of gravity on the unbalanced mass M2 has any effect, because masses M and M1 are already in static balance. The gravity couple created by unbalance mass M2 is corrected by a mass M3 at 180° to the unbalance mass M2. This places the lower plane of the body in balance, hence the entire body also is now in static and dynamic balance. Experience has also shown that a body so balanced will then be intrinsically in static and dynamic balance, and need not be mounted in any particular plane, (such as the plane of the self-aligning bearing 26) and hence can be mounted on a vehicle or machine with perfect results. In the present invention, the planes of the masses M, M1 and M2, M3 are the upper and lower rim flanges of the wheel.

*Operation*

The operation of the balancer of the present invention will now be reviewed briefly. After mounting the wheel W*h*, it is necessary to spin the wheel manually to obtain an angular rotation in the order of 100 r.p.m. As will be seen, the wobble angle "*a*" resulting from dynamic unbalance in the present apparatus is largely independent of the angular velocity of the wheel.

Figure 8:
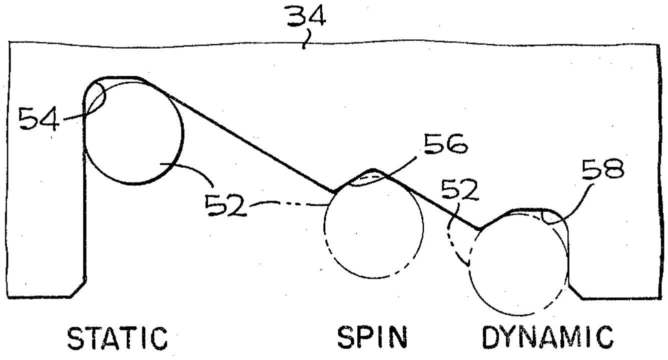
FIG. 8 is a partial development of the control cam.

In order to prevent excessive tilting of the wheel while it is being manually spun up to a dynamic balance velocity, the wheel is placed in the spin position shown in FIGURE 4. This is accomplished by rotating the handle 36 until the detents 56 of the cam 34 rest over the fixed pin 52, as best seen in FIGURE 8. Referring to FIGURE 4, in this condition the paddle 82 on the wheel mounting tube 20, closely fits within the annular internal projection 80 on the damping cup 42 and hence angular inclination of the wheel mounting tube 20 during the spinning operation is restricted to a very small angle. The damping liquid 84 serves as a lubricant between the paddle 82 and the annular ring 80 on the balancing cup during the spinning operation. It will be noted in FIGURE 4 that the cam 34 has lifted the pedestal tube 32 to bring a shoulder 106 against the lower face of the inner race of the self-aligning bearing 26. This raises the wheel mounting tube 20, so that the universal bearing ball 30 is clear of the anvil 62, and the wheel and mounting tube 20 are supported on the pedestal by the self-aligning bearing 26.

After the wheel has been given the desired angular velocity, the lever 36 is moved to the dynamic position. This position is shown in FIGURES 1, 5, 6 and 7 in FIGURE 13, which illustrates a modified embodiment of the invention. In this position the detents 58 are brought over the pin 52, and the wheel mounting tube 20 is lifted further. As seen in FIGURE 5, the paddle 82 on the lower end of the wheel mounting tube 20 now clears the internal projection 80 on the damping cup 42, and the paddle and mounting tube 20 are largely out of the damping oil body 84. This further raising of the wheel mounting tube 20, and the removal of the paddle 82 from the oil, causes the liquid level of the damping oil body 84 to fall. The wheel is now rotating, and unless it is in perfect dynamic balance a condition shown in FIGURES 11 to 11C are presented to the observer. The bubble 100 will assume a fixed position in space over the vertical axis *y–y*, and will remain over one of the colored sectors on the indicia card 94. Of course it may lie over an intersection of two colors, but this also gives a circumferential position. The greater the dynamic unbalance, the further the bubble 100 will be displaced radially from the center of the level L. All indicia except the number or asterisk which appears beneath the bubble 100, are partially obscured by the gray tint of the level liquid, and this one indicium, which rotates at a relatively slow speed while centered within the bubble 100, is easily observed and noted. Thus the color seen through the bubble indicates the position of the unbalance, and the indicium seen through the bubble indicates the amount thereof.

It should be noted that a small triangle 102 is engraved on the face of the level, the wheel *Wh* is placed on the apparatus so that the valve stem is opposite this triangle. This merely makes possible replacing the wheel on the balancer in the same position, if a re-balancing operation is performed.

After returning the system to the spin position and stopping the rotation, balance weights are now applied to the upper rim flange of the wheel in alignment with the position of the bubble 100 in its sector. The fact that colored sectors are used, permits indentification of the unbalance sector readily, even through the wheel is rotating. However, as will be seen the speed of rotation need not be great to provide an acceptable wobble or unbalance angle "*a*," indicated in FIGURES 5 and 12.

After a balance weight is applied, the apparatus can be rotated in the spin position, and then replaced in the dynamic balance position to check the adequacy of the weight. Experience shows that the first weight, although it may not completely and perfectly balance a wheel, will always provide a correction in the right direction, and upon the first test after application of the first weight, any slight dynamic unbalance that remains is usually corrected by merely placing a larger weight in the same colored sector on the indicia cord. Obviously, if an overcorrection has been made, this is revealed by the revelation fo a sector color through the bubble, that is diametrically opposite to the color previously observed. The weight first placed upon the wheel rim can then be reduced in value.

To balance the assembly statically, the lever 36 is shifted to the static balance position, shown in FIGURE 2. This brings the detent 54 of the cam 34 over the fixed pin 52, and causes the universal bearing ball 32 to rest on the anvil 62. Now the paddle 82 is in the damping liquid 84 in the cup 42, so that the wheel quickly settles into an inclined position, caused by a gravity couple. The bubble 100 indicates the location and degree of static unbalance, and thus is readily corrected by applying a weight of a magnitude indicated by the indicium seen through the bubble, and at the location (sector) of the bubble. Again, a second trial may be necessary in case the weight first applied is slightly over or under that necessary to perfectly statically balance the wheel. The static correcting weights are applied to the lower rim flange, and not to the upper rim flange, as were the dynamic unbalance weights. It will be remembered that the dynamic unbalance weights were applied to the upper rim flange in a manner which insured static balance to those equivalent masses, and so that upon completion of the static balance by application of weights to the lower rim flange as just described, the wheel will be both in perfect static and dynamic balance.

*Wheel and tire section variations*

In order to simplify the apparatus, no adjustment is provided to insure that the plane of the weight applied to the lower end flange lies exactly in the plane *x—x* of the self-aligning bearing 26 for all tire sections. The geometry of the apparatus is such that this alignment with plane *x—x* will favor the most commonly manufactured tire and rim assemblies. In the case of larger section tires (larger width rim bases) the lower rim flange may not fall in the plane *x—x* but may fall somewhat below it. Also, with these larger section tires, the amount of dynamic unbalance present relative to the polar moment of inertia of the tire is proportionately less. The instrument of the present invention can still be used for these conditions. The balancing procedure is changed to statically balance first, by placing a weight on the lower rim flange, and then correcting the dynamic unbalance with two equal weights, on the top and on the bottom, but 180° apart. These weights are selected to provide the necessary couple for correcting dynamic unbalance but have no effect on the static balancing just completed.

The machine can be rendered more highly sensitive to dynamic unbalance by the application of one of a series of compensating weights W4, which slip over the upper end of the wheel mounting tube 20. Usually only two sizes of these weights will be used, one for medium size tires and a heavier one for larger tires. To give typical design considerations the upper end of the wheel mounting tube 20 which supports these weights is approximately 12 inches above the plane *x—x* of the self-aligning bearing 26. For medium large section tires a weight W4 weighing in the order of 2 pounds can be applied, and for very large section tires a weight W4 weighing in the order of 8 pounds can be substituted therefor.

It is important that the weight W2, which is below the center of gravity of the instrument when a wheel and tire are assembled thereon, have a relatively low polar moment of inertia about axis *y—y*, and a relatively high diametral moment of inertia about axis *x—x*. To give typical design considerations, in the ordinary range of vehicle wheels, the horizontal mid-plane of the weight W2 will be a distance of *d*2 of approximately 5¼" below the plane *x—x* of the self-aligning bearing 26, and the weight W2 will weigh 18 pounds. The internal dimension of the annular weight W2 is approximately 5 inches so that it will clear the pedestal during the balancing operations.

*Obtaining high sensitivity*

One of the important features of the balancing apparatus of the present invention when used as dynamic balancer, is that a relatively large angle "*a*" of gyration or wobble is obtained at low angular velocities. The manner in which the balancing apparatus of the present invention obtains a large wobble angle "*a*" for a relatively small angular velocity of the mass is explained in FIGURE 12. The nomenclature employed in the figure is as follows:

*F*3, *F*3′=Dynamic unbalance couple
*a*=Wobble angle
*w*=Angular velocity
*Ip*=Polar moment of inertia about *y′—y′*
*Id*=Diametral moment of inertia about self-aligning bearing
*Ft*=Centrifugal tilting force
*Wt*=Total weight of rotor and tire system (restoring force)
*W*3, *W*3′=Unbalanced mass couple
*d*3=Couple arm of W3, W3′
*dt*=Displacement center of gravity below self-aligning bearing
*rt*=Gravity couple arm=*dt* sin *a*
$C=W^2\ (Ip-Id)a$=dynamic restoring couple, about center of gravity, C.G.

Since the wobble angle "*a*" is small (app. 7° max.), its sine is approximately equal to the angle.

As indicated in the formula at the bottom of FIGURE 12, the wobble angle "*a*" varies directly as a dynamic unbalance couple engendered by the forces F3, F3′. These forces are caused by an unbalanced couple mass W3, W3′, which are assumed to have a net couple arm of *d*3. The value of this unbalance couple (which tends to increase the wobble angle "*a*") is shown in the formula at the bottom of FIGURE 12, and is equal to $W3/g(w^2r3d3)$, and forms the numerator of the fraction. The denominator of the fraction which represents the angle "*a*," contains three terms. At this point it should be mentioned that in deriving the equation given in FIGURE 12, since the angle "*a*" is usually small, seldom greater than 7°, the sine of "*a*" is considered to be equal to the angle itself, as in conventional mathematical analysis.

It will be seen that anything which reduces the values of the three terms in the denominator of the formula for the wobble angle "*a*," will increase the wobble angle. The first term in the denominator, which is referred to as the Dynamic Restoring Couple, is equal to $(Ip-Id)w^2$. I*p* is the polar moment of intertia about the axis *y′*—*y′* of rotation, and it is desirable to keep this as small as possible. Both the annular restoring weight W2, and the auxiliary sensitivity-increasing weights W4 have a small polar moment of intertia I*p*.

The Diametral Moment of Intertia I*d*, is preferably made as large as possible, because this decreases the restoring couple and tends to increase the wobble angle "*a*." The diametral restoring couple of the system as it is rotating about the axis *y′*—*y′*, and with the axis *y′*—*y′* wobbling about the vertical axis *y*—*y*, is greatly affected by the lower weight W2, and the upper weight W4 (if present). By selecting a relatively large lower weight W2, well below the center of gravity C.G. of the system, the Diametral Moment of Inertia I*d*, can be made to almost equal the Polar Moment of Inertia I*p*. Thus the term $(Ip-Id)$ appearing in the numerator of the formula can be made quite small.

Another term in the denominator of the fraction for the wobble angle "*a*" which is helpful, is that of the Centrifugal Tilting Couple. The centrifugal tilting couple which equals $Wt/g(w^2dt)$, is due to the gyration of wobbling about the center of gravity C.G., of the rotational axis *y′*—*y′*. It is noted that this term is subtractive in the formula, and hence decreases the denominator, thereby increasing the wobble angle "*a*."

It will be noted from the formula, that the term $w^2$ appears in all three of the terms just discussed and hence its effect on these terms, namely the Unbalance Couple, the Dynamic Restoring Couple, and the Centrifugal Tilting Couple, is independent of the angular velocity *w* of the system.

There remains another term which must be considered, although it is small. This is the Gravity Restoring Couple, which equals *Wtrt*. This is a positive term and tends to increase the value of the denominator of the fraction, and hence should be kept as small as possible in order to render the instrument speed insensitive. This is done by making the distance *dt* by which the center of gravity C.G. is displaced below the horizontal plane *x*—*x* of the self-aligning bearing 26, quite small. Also the angle "*a*" which is only 7° is numerically small, so that the gravity couple arm *rt* is minute. Thus the Gravity Restoring Couple itself does not appreciably reduce the total wobble angle "*a*." It will be noted that the Gravity Restoring Couple is the only term which does not contain $w^2$. However, the latter couple is so small, that it does not affect the validity of the simple equation for angle "*a*," within practical limits. This has been verified by experiment.

Thus it can be seen that by careful selection of the polar and diametral effects of the lower weight W2, by positioning the center of gravity C.G. close to the plane *x*—*x* of the self-aligning bearing, and as required, adding sensitivity increasing weight W4 to the top of the tube 20, a dynamic balancer can be obtained which gives a wobble angle "*a*" that is substantially independent of angular velocity, and which is large enough to be read directly in a level, without the use of magnifying electrical, optical lever systems or the like.

Important factors in the design relative to increasing balancer sensitivity are $W2d2^2$ and $W4d4^2$. In the example given, the first term will be about 500 pounds in.$^2$ and the second will vary from 300 to 1,200 pounds in.$^2$ with weights W4 varying from two to eight pounds. Even without an upper weight W4, the average wheel will produce a wobble angle "*a*" of 7° under the influence of a couple equivalent to that created by two four ounce, diametrically opposed weights, with one weight on each rim flange.

*Decreasing critical speed*

The dynamic balancing system of the present invention can be designed so that it operates at above critical speed, that is the system inherently would tend to rotate about its center of gravity instead of its geometrical center. This eliminates *rt*, and the term *Wrrt* in the equation. The system is now even more independent of angular velocity.

Figure 13:
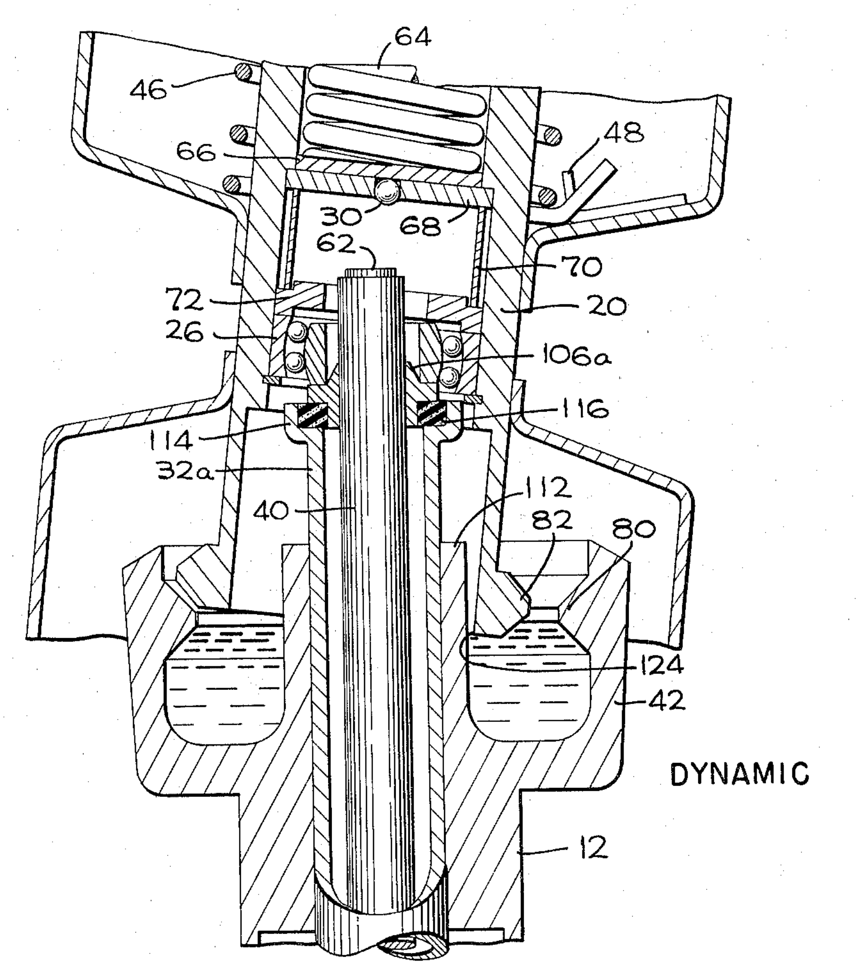
FIG. 13 is a fragmentary section through a modified form of wheel balancer, wherein the self-aligning bearing is mounted resiliently to reduce the critical speed of rotation.

If it is desired to lower the critical speed, the construction of FIGURE 13 can be employed. Here the pedestal tube **32*a*, has an enlarged cup shaped end portion 114, into which is bonded a sponge rubber bushing 116. The bearing lifting nose 106*a*, formerly integral with the pedestal sleeve, is now separate therefrom, and is mounted in the sleeve by means of the aforesaid sponge rubber bushing 116**. This resilient mounting of the self-aligning bearing in the pedestal lowers the critical speed of the apparatus.

Figure 14:
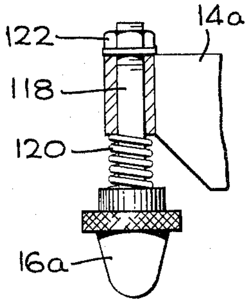
FIG. 14 is a fragmentary section taken at one of the pedestal mounting feet wherein the latter are resiliently mounted to reduce the critical speed of rotation.

FIGURE 14 shows another means for lowering the critical speed. Here each of the three legs **14*a* of the apparatus are slidably mounted in bolts 118, which carry the rubber feet 16*a*. The legs 14*a* are supported on the rubber feet 16*a* by compression springs 120. A leveling nut 122 is threaded to the upper end of each bolt 118**.

*Precession restoration*

In some cases during the dynamic balancing operation, the dynamic unbalance may be so great as to cause the wheel mounting tube 20 to tilt to its extreme limits. The action that then occurs can be explained relative to FIGURE 13. Here the instrument has tilted almost to its limit, and a corner 124 of the wheel mounting tube 20 at the paddle 82 is about to touch the upper projection 112 of the pedestal 12, if contact between these parts does occur, a restoring couple will be applied to the rotating tube 20, changing the angular momentum, and causing a precession of the rotational axis of the tube towards the vertical position. This prevents prolonged and forceful contact between the corner 24 and the sleeve extension 112. Of course, as soon as a correction balance weight has been applied, contact between the corner 124 and the sleeve 112 will no longer occur, and a refinement of the balancing procedure can be carried out to complete the dynamic balancing operation.

Thus it can be seen that salient features of the balancing apparatus of the present invention are as follows:

Single lever control for spinning and both static and dynamic unbalance.

Sensitive apparatus.

A large wobble angle is obtained upon low speed manual rotation of the wheel.

Easily read spirit level.

Self-aligning bearing, protected from dirt.

Self restoring at limits of tilt during dynamic balancing.

Simply adjustable for various tire sections.

Requires no electrical, optical or mechanical multiplication to obtain readings.

Requires no spin motors.

Having completed a detailed description of the present invention so that those skilled in the art may practice the same, I claim:

1. A combined static and dynamic wheel balancer comprising pedestal means, wheel mounting means surrounding said pedestal means, a universal bearing for supporting said wheel mounting means on said pedestal means for static balancing, a self aligning rotary bearing for supporting said wheel mounting means on said pedestal means independently of said universal bearing for dynamic balancing, means for selectively supporting said wheel mounting means on either bearing, and annular weight means having a low polar moment of inertia mounted on said wheel mounting means a substantial distance from said self aligning bearing, said distance being sufficient to cause the diametrical moment of inertia of the assembly of said weight, balancer and wheel means, to approach the value of the polar moment of inertia of the assembly to an extent adequate to provide a substantial wobble of the wheel caused by a relatively small dynamic unbalance.

2. The wheel balancer of claim 1, wherein said weight means includes an annular weight that is below said self aligning bearing.

3. The wheel balancer of claim 2, wherein said wheel mounting means has an extension that projects above said self aligning bearing, and said weight means includes a small diameter weight removably mounted on said extension.

4. A dynamic wheel balancer comprising pedestal means, wheel mounting means above said pedestal means, a self aligning bearing supporting said wheel mounting means on said pedestal means, an annular weight having a low polar moment of inertia mounted on said wheel mounting means a substantial distance from said bearing, said distance being sufficient to cause the diametral moment of inertia of the assembly of said weight, balancer and wheel to approach the value of the polar moment of inertia of the assembly; a universal spirit level on the upper end of said wheel mounting means having a transparent upper wall and a lower wall, a spirit with an occluded bubble between said walls, said level including an indicia surface on the top of the lower wall that is visible through said bubble and has a plurality of sectors of different colors for indicating the location of unbalance, and concentric rings of indicia on said indicia surface for indicating the amount of unbalance, said bubble being flattened sufficiently for providing a window through which one of said indicia is readable.

5. The balancer of claim 4, wherein said bubble is flattened between the upper and lower level walls, and wherein said level spirit is tinted sufficiently to mask indicia and colors not visible through said bubble window.

6. The balancer of claim 4, wherein said level spirit is tinted gray.

7. The balancer of claim 6, wherein there are six sectors, two white with black and gray indicia, respectively; two black with white and gray indicia respectively; and two gray with black and white indicia, respectively.

8. A combined static and dynamic balancer comprising tubular pedestal means, a cup on the upper end of said pedestal means and formed with an annular internal projection, damping liquid in said cup, a wheel mounting tube, a rod in said pedestal means, a universal bearing between said rod and tube for static balancing, a paddle on the lower end of said tube and disposed within said cup and below said projection for static balancing, a self aligning bearing below said universal bearing, single means for raising said tube and connecting said self aligning bearing between said tube and said pedestal means for spinning the wheel, said paddle being then disposed at said annular projection, said means further raising said tube to bring said paddle above said annular projection and substantially out of said liquid for dynamic balancing, and a universal spirit level on the upper end of said tube.

9. A dynamic wheel balancer comprising pedestal means, a wheel mounting element surrounding the upper portion of said pedestal means, a self aligning rotary bearing connecting said pedestal means and said wheel mounting element, an annular weight centered on the rotational axis of said wheel mounting element below said bearing and carried by said element, said weight being of sufficient mass and being sufficiently spaced below said bearing to reduce the difference between the polar moment of inertia of the system about its axis of rotation and the diametral moment of inertia of the system due to gyration of said axis about said bearing, to a very small value.

10. The balancer of claim 9, wherein said difference in moments of inertia is small enough to create a wobble angle of the axis of rotation of at least 7 degrees, with an unbalance couple equivalent to a couple of two four ounce weights on the rim of a wheel being balanced.

11. The balancer of claim 9, wherein said self aligning bearing is resiliently mounted to lower the critical speed of rotation.

12. The balancer of claim 9, wherein said pedestal means is resiliently mounted on the floor to lower the critical speed of rotation.

13. The wheel balancer of claim 9, wherein the upper end of said wheel mounting element is weighted to increase the diametral moment of inertia.

14. The wheel balancer of claim 9, wherein said wheel mounting element includes a wheel mounting flange that is vertically positioned to dispose the lower side flange of the wheel tire rim substantially in the plane of said self aligning bearing.

15. The wheel balancer of claim 13, wherein the product of the square of the displacement of the center of mass of said upper weight from the plane of said self aligning bearing and the weight of said upper weight, lies within the range of 300 to 1200.

16. The balancer of claim 15, wherein a damping cup is mounted on the upper end portion of the pedestal means, a paddle is mounted on said wheel mounting element and within said cup, and a damping liquid is contained in the cup.

17. A dynamic wheel balancer comprising pedestal means, wheel mounting means above said pedestal means, a self aligning bearing supporting said wheel mounting means on said pedestal means, an annular weight mounted on said wheel mounting means below said bearing and below the center of gravity of the system, including the wheel being balanced, and a universal spirit level on the upper end of said wheel mounting means, said wheel mounting means having a radial flange so disposed that the lower side flange of a wheel tire rim mounted on the balancer is substantially in the plane of said self aligning bearing.

18. The balancer of claim 17 wherein said level is a substantial distance above said self aligning bearing, and a weight is mounted on said wheel mounting means at said level.

19. A dynamic wheel balancer for pneumatic tire road vehicle car wheels comprising pedestal means, a wheel mounting element surrounding the upper portion of said pedestal means, a self aligning rotary bearing connecting said pedestal means and said wheel mounting element, a universal level on the upper end of said wheel mounting element, an annular weight centered on the rotational axis of said wheel mounting element below said bearing and carried by said element, the product of the weight of said annular weight in pounds, and the square of its displacement below said bearing in inches, being not substantially less than 500, and a weight adjacent the upper end of said wheel mounting element, the product of the weight of said upper weight in pounds, and the square of its displacement above said bearing in inches, lying substantially within the range of 300–1200, these values being selected for balancing common types of pneumatic tire road vehicle wheels.

20. A static wheel balancer comprising pedestal means, a wheel mounting tube having a lower portion surrounding the upper end of said pedestal means, said pedestal means terminating in a bearing anvil, a centrally apertured ball mounting plate in said tube above said anvil, a bearing ball in said plate aperture, a ball back up plate slidable in said tube, a spring in said tube pressing said back up plate against said ball mounting plate for backing up said bearing ball under load, means for preventing said bearing ball from falling out of the aperture in said ball mounting plate, and a universal spirit level on the upper end portion of said tube.

21. A combined static and dynamic balancer comprising tubular pedestal means, a cup on the upper end of said pedestal means and formed with an annular internal projection, damping liquid in said cup, a wheel mounting tube, a universal bearing for supporting said wheel mounting tube during static balancing, a self aligning rotary bearing for supporting said wheel mounting tube during dynamic balancing, a paddle on the lower end of said wheel mounting tube and disposed within said cup; means for supporting said wheel mounting tube on said universal bearing with said paddle disposed below said cup projection for static balancing; means for supporting said wheel mounting tube on said self aligning bearing with said paddle disposed at said annular projection for spinning the wheel; means for supporting said wheel mounting tube on said self aligning bearing with said paddle disposed above said annular projection and substantially out of said liquid for dynamic balancing; and a universal spirit level on the upper end of said wheel mounting tube.

References Cited by the Examiner

UNITED STATES PATENTS

| | | | |
|---|---|---|---|
| 2,110,343 | 3/1938 | Taylor | 73—483 |
| 2,316,524 | 4/1943 | Martin | 73—459 |
| 2,553,058 | 5/1951 | Martin | 73—459 |
| 2,636,382 | 4/1953 | Martin | 73—459 |
| 2,968,185 | 1/1961 | Jacobsen | 73—459 |
| 3,034,220 | 5/1962 | Fell | 33—212 |
| 3,159,035 | 12/1964 | Mueller et al. | 73—483 |

FOREIGN PATENTS

| | | |
|---|---|---|
| 898,021 | 6/1962 | Great Britain. |

RICHARD C. QUEISSER, *Primary Examiner.*

JAMES J. GILL, *Examiner.*